United States Patent
Amano et al.

(10) Patent No.: US 6,633,397 B2
(45) Date of Patent: Oct. 14, 2003

(54) OUTPUT APPARATUS AND OUTPUT ENVIRONMENT SETTING METHOD IN OUTPUT APPARATUS

(75) Inventors: Yasuko Amano, Kawasaki (JP); Nobuhiko Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/508,696

(22) Filed: Jul. 28, 1995

(65) Prior Publication Data

US 2002/0063876 A1 May 30, 2002

(30) Foreign Application Priority Data

Jul. 28, 1994 (JP) .............................................. 6-195849

(51) Int. Cl.[7] .............................................. G06K 15/00
(52) U.S. Cl. ...................................... 358/1.15; 358/1.1
(58) Field of Search ............................... 358/1.13, 1.14, 358/1.15, 1.1, 1.16, 1.17, 404, 444, 407, 468, 442, 1.18; 400/703, 61, 76, 83; 345/2, 1, 329, 326, 330–332, 339, 349, 352, 961, 964; 399/1, 8, 81–82; 700/83; 707/527

(56) References Cited

U.S. PATENT DOCUMENTS 5,431,505 A * 7/1995 Kato et al. .................. 400/703

FOREIGN PATENT DOCUMENTS

EP 0575168 * 12/1993

* cited by examiner

Primary Examiner—Gabriel Garcia
(74) Attorney, Agent, or Firm—Fitzpatrick, Cella, Harper & Scinto (57) ABSTRACT

An output apparatus for forming output information on the basis of input information inputted from an external apparatus and outputting is constructed by a connector for connecting the output apparatus to the external apparatus so that they can communicate, a memory to store a data group to manage a menu structure for setting an output environment, an internal environment setting unit for setting an output environment on the basis of the data group, a transfer unit for transferring the data group from the memory to the external apparatus through the connector, and an external environment setting unit for setting an output environment onto the external apparatus on the basis of the data group transferred to the external apparatus. An operating method for the internal environment setting unit and an operating method for the external environment setting unit are identical.

9 Claims, 6 Drawing Sheets

OUTPUT APPARATUS AND OUTPUT ENVIRONMENT SETTING METHOD IN OUTPUT APPARATUS

BACKGROUND OF THE INVENTION

1. Field of the Invention

The invention relates to an output apparatus such as a printing apparatus which is connected to an external apparatus such as a host computer or the like so that they can communicate and also relates to an output environment setting method.

2. Related Background Art

Generally, as one of peripheral equipment connected to a host computer, there is a printing apparatus for fetching data which is supplied from the host computer and outputting the data in a predetermined format.

The printing apparatus has a plurality of functions and holds a group of data to manage a menu structure for setting a printing environment which was set for those functions. Similarly, a group of data to manage a menu structure for setting a printing environment is held in the host computer. The data group to manage the menu structure for setting the printing environment is individually managed by the printing apparatus and the host computer, respectively.

When the data from the host computer is outputted from the printing apparatus, the user executes a setting operation to the printing apparatus and the host computer so that the set contents of the data group to manage the menu structure for setting the printing environment of the printing apparatus and the set contents of the data group to manage the menu structure for setting the printing environment of the host computer coincide.

However, since the data group to manage the menu structure for setting the printing environment is individually managed by the printing apparatus and the host computer, respectively, when the data from the host computer is outputted from the printing apparatus, it is necessary for the user to execute the setting operation for making the set contents of the data group to manage the menu structure for setting the printing environment of the printing apparatus coincide with the set contents of the data group to manage the menu structure for setting the printing environment of the host computer and it is troublesome.

SUMMARY OF THE INVENTION

It is an object of the invention to provide an output apparatus and a printing environment setting method in which set contents of a data group to manage a menu structure for setting an environment and set contents of a data group to manage a menu structure for setting an environment of an external apparatus can be made coincide without executing a troublesome operation.

According to the invention, there are provided: connecting means for connecting with an external apparatus so that they can communicate; memory means for storing a data group to manage a menu structure for setting an output environment; internal environment setting means for setting an output environment on the basis of the data group; transfer means for transferring the data group to the external apparatus from the memory means through the connecting means; and external environment setting means for setting an output environment onto the external apparatus on the basis of the data group transferred to the external apparatus.

In the invention, when transfer instruction information is supplied, the transfer means transfers the data group to the external apparatus.

In the invention, when the operation to instruct the transfer of the data group to the external apparatus is executed by the user, the transfer instruction information is supplied to the transfer means.

In the invention, the transfer instruction information is supplied to the transfer means when a power source is turned on.

In the invention, there are provided: holding means for holding the previous set contents of the data group so that they can be updated; and judging means for comparing the current set contents of the data group with the previous set contents, thereby judging the presence or absence of the updating of the set contents of the data group on the basis of the comparison result, wherein when the set contents of the data group are updated, the transfer instruction information is supplied to the transfer means.

In the invention, the transfer instruction information is supplied from the external apparatus to the transfer means through the connecting means.

In the invention, the transfer instruction information is supplied to the transfer means when the data group of the external apparatus is extinguished.

In the invention, the transfer instruction information is supplied to the transfer means when the power source of the external apparatus is turned on.

In the invention, the external environment setting means updates the set contents of the transfer red data group by an operation instruction from the external apparatus, again sets the output environment onto the external apparatus on the basis of the data group whose set contents were updated, and transfers the data group whose set contents were updated to the memory means through the connecting means. The transferred data group is stored in the memory means. The internal environment setting means again sets the output environment on the basis of the data group whose set contents were updated.

In the invention, an operating method for the internal environment setting means and an operating method for the external environment setting means are identical.

In the invention, there are provided: a step of storing a data group to manage a menu structure for setting an output environment into memory means provided for an output apparatus; a step of setting an output environment onto the output apparatus on the basis of the data group; a step of transferring the data group from the output apparatus to the external apparatus through the connecting means; and a step of setting an output environment onto the external apparatus on the basis of the data group transferred to the external apparatus.

In the invention, when the transfer instruction information is supplied from the output apparatus, the data group is transferred to the external apparatus.

In the invention, when the transfer instruction information is supplied from the external apparatus, the data group is transferred to the external apparatus.

In the invention, there are provided: a step of updating the set contents of the transferred data group by an operating instruction from the external apparatus, again setting the output environment onto the external apparatus on the basis of the data group whose set contents were updated, and transferring the data group whose set contents were updated to the memory means through the connecting means; a step of storing the transferred data group in the memory means; and a step of again setting the output environment onto the output apparatus on the basis of the data group whose set contents were updated.

In the invention, an operating method for the output environment setting which is executed on the output apparatus and an operating method for the output environment setting which is executed on the external apparatus are identical.

As described above, according to the invention, the apparatus is connected to the external apparatus by the connecting means so that they can communicate. The data group to manage the menu structure for setting the output environment is stored in the memory means. The output environment is set by the internal environment setting means on the basis of the data group. The data group is transferred from the memory means to the external apparatus through the connecting means by the transfer means. The output environment is set onto the external apparatus by the external environment setting means on the basis of the data group transferred to the external apparatus. Therefore, the data group to manage the menu structure for setting the same output environment can be possessed to the external apparatus without executing a troublesome operation. The same output environment can be easily set onto the external apparatus.

According to the invention as described above, when the transfer instruction information is supplied, the data group is transferred to the external apparatus by the transfer means. Therefore, by supplying the transfer instruction information as necessary, the data group to manage the menu structure for setting the same output environment can be possessed to the external apparatus.

According to the invention as described above, the previous set contents of the data group are held in the holding means so that they can be updated. The current contents of the data group are compared with the previous set contents by the judging means. On the basis of the comparison result, the presence or absence of the updating of the set contents of the data group is judged. When the set contents of the data group are updated, the transfer instruction information is supplied to the transfer means. Therefore, when the set contents of the data group are updated, the updated data group can be certainly possessed to the external apparatus.

According to the invention as described above, since the transfer instruction information is supplied from the external apparatus to the transfer means through the connecting means, the external apparatus can possess the data group as necessary.

According to the invention as described above, the set contents of the transferred data group are updated by the external environment setting means in accordance with an operating instruction from the external apparatus. On the basis of the data group whose set contents were updated, the output environment is again set onto the external apparatus. The data group whose set contents were updated is transferred to the memory means through the connecting means. The transferred data group is stored into the memory means. The output environment is again set by the internal environment setting means on the basis of the data group whose set contents were updated. Therefore, the same output environment can be set from the external apparatus.

According to the invention as described above, since the operating method for the internal environment setting means and the operating method for the external environment setting means are identical, it is possible to prevent that the user feels a physical disorder in the operation regarding the output environment setting which is executed on the external apparatus.

According to the invention as described above, the data group to manage the menu structure for setting the output environment is stored in the memory means provided for the output apparatus. The output environment is set onto the output apparatus on the basis of the data group. The data group is transferred from the output apparatus to the external apparatus through the connecting means. The output environment is set onto the external apparatus on the basis of the data group transferred thereto. Therefore, the data group to manage the menu structure for setting the same output environment can be possessed to the output apparatus and the external apparatus without executing a troublesome operation. The same output environment as the output environment set on the output apparatus can be easily set onto the external apparatus.

According to the invention as described above, when the transfer instruction information is supplied from the output apparatus, the data group is transferred to the external apparatus. Therefore, by supplying the transfer instruction information as necessary, the same data group as the data group which the output apparatus has can be possessed to the external apparatus.

According to the invention as described above, when the transfer instruction information is supplied from the external apparatus, the data group is transferred to the external apparatus. Therefore, the external apparatus can possess the same data group as the data group of the output apparatus as necessary.

According to the invention as described above, the set contents of the transferred data group are updated by an operating instruction from the external apparatus. On the basis of the data group whose set contents were updated, the output environment is again set onto the external apparatus and the data group whose set contents were updated is transferred to the memory means through the connecting means. The transferred data group is stored into the memory means. On the basis of the data group whose set contents were updated, the output environment is again set onto the output apparatus. Therefore, the output environment on the output apparatus can be set from the external apparatus.

According to the invention as described above, since the operating method for the output environment setting which is executed on the output apparatus and the operating method for the output environment setting which is executed on the external apparatus are identical, it is possible to prevent that the user feels a physical disorder in the operation regarding the output environment setting.

DETAILED DESCRIPTION OF THE PREFERRED EMBODIMENTS

Embodiments of the present invention will now be described hereinbelow with reference to the drawings.

First Embodiment

Figure 1:
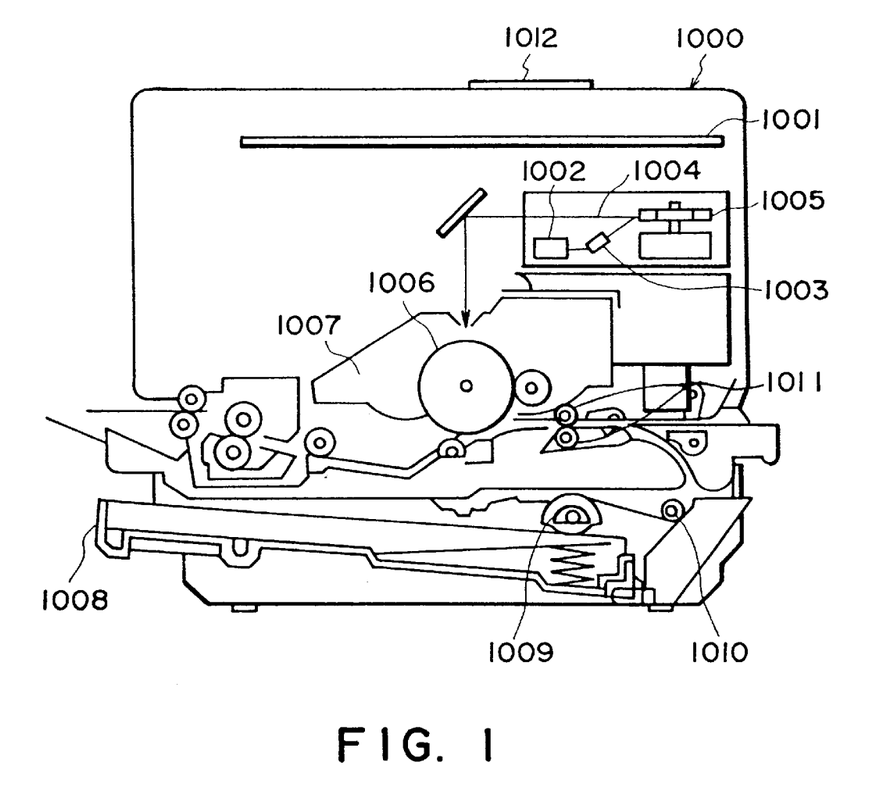
FIG. 1 is a constructional diagram showing a construction of a laser beam printer according to the first embodiment of an output apparatus of the invention.

FIG. 1 is a constructional diagram showing a construction of a laser beam printer according to the first embodiment of an output apparatus of the invention.

A laser beam printer 1000 is connected to an external host computer so that they can communicate. The printer 1000 receives input data (character code, control code, etc.), form information, macro command, etc. which are supplied from the host computer, stores those information, forms output data such as corresponding character pattern, form pattern, etc. on the basis of those information, and forms an image onto a recording paper as a recording medium.

As shown in FIG. 1, the laser beam printer 1000 has: a printer control unit 1001 for controlling the whole apparatus and analyzing input data or the like which is supplied from the host computer; and an operation section 1012 having switches for operations, a liquid crystal display, an LED display, and the like.

The printer control unit 1001 mainly converts the character code to a video signal of the corresponding character pattern and outputs the video signal to a laser driver 1002.

The laser driver 1002 comprises a circuit for driving a semiconductor laser 1003. This circuit switches the on/off states of a laser beam 1004 which is emitted from the semiconductor laser 1003 in accordance with the inputted video signal. The laser beam 1004 is swung to the right and left by a rotary polygon mirror 1005 and scans and exposes an electrostatic drum 1006. By the scan and exposure, an electrostatic latent image of a character pattern is formed on the electrostatic drum 1006. The electrostatic latent image is developed by a developing unit 1007 arranged around the drum 1006 and, after that, it is transferred to a recording paper.

A cut sheet is used as a recording paper. Cut sheet recording papers are enclosed in a paper feed cassette 1008 attached to the laser beam printer 1000.

The paper feed cassette 1008 has a size detecting mechanism to detect a size of recording paper enclosed. The size of recording paper detected by the detecting mechanism is supplied to the control unit 1001. The number of paper feed cassettes 1008 which can be attached to the printer 1000 is equal to at least one or more. Each of the paper feed cassettes 1008 has been prepared every size of the enclosed recording paper.

The recording papers in the paper feed cassette 1008 are picked up and fed into the apparatus and conveyed toward the electrostatic drum 1006 one by one by a paper feed roller 1009 and convey rollers 1010 and 1011.

At least one or more card slots are provided for the laser beam printer 1000. In addition to built-in fonts, an optional font card and a control card (emulation card) of a different language system can be connected to the laser beam printer 1000.

Figure 2:
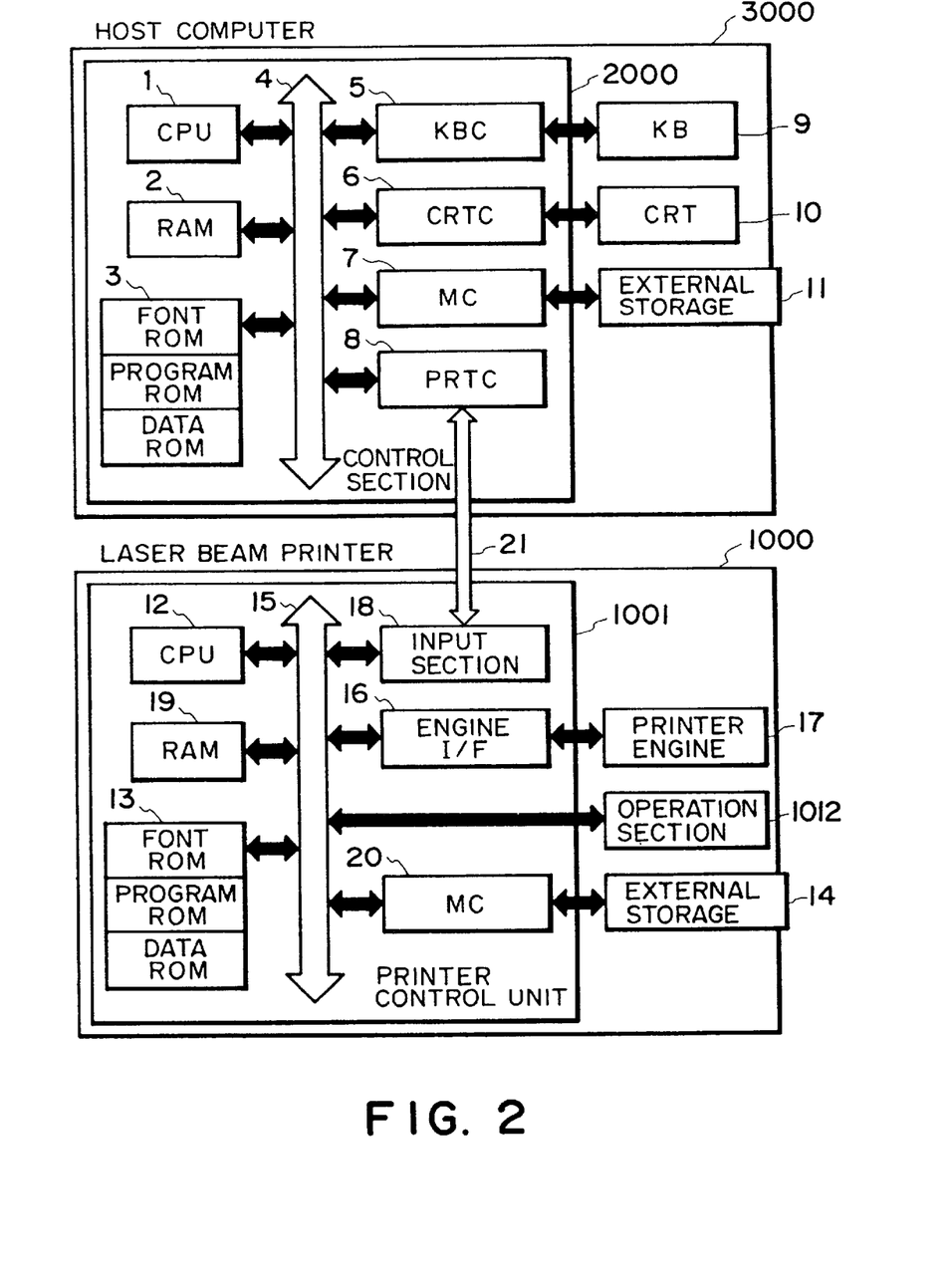
FIG. 2 is a block diagram showing a construction of a printer control system of a laser beam printer of FIG. 1.

A printer control system of the laser beam printer 1000 will now be described with reference to the drawings. FIG. 2 is a block diagram showing a construction of the printer control system of the laser beam printer of FIG. 1.

As shown in FIG. 2, a host computer 3000 connected to the laser beam printer 1000 has a control section 2000. The control section 2000 has a CPU 1 for executing a process of a document in which a figure, an image, a character, a table (including a table calculation or the like), and the like are mixed and exist on the basis of a document processing program stored in a program ROM of an ROM 3. The CPU 1 integratedly controls each device connected to a system bus 4.

In addition to the control program such as a document processing program mentioned above or the like, control procedures (flowcharts shown in FIGS. 5 and 7) which are executed by the CPU 1 and the like are stored in the program ROM of the ROM 3. Font data or the like which is used when executing the document process mentioned above is stored in a font ROM. Various kinds of data which is used when executing the document process mentioned above is stored in a data ROM.

When the control program or control procedure stored in the ROM 3 is executed by the CPU 1, an RAM 2 is used as a work memory to temporarily store various data in an arithmetic operation and a logical judgment of the CPU 1.

An instruction is given from a keyboard (shown by KB in the diagram) to the CPU 1. The keyboard 9 has: a group of character keys which are used to input a character, numeral, symbol, or the like; and a plurality of function keys to instruct the execution of a movement of a cursor, a format setting process, and an activation.

A key code converting process (conversion to an internal code) for an input symbol from the keyboard 9 is executed by a keyboard controller (shown by KBC in the diagram) 5.

A character, numerical expression, or the like corresponding to the key code inputted from the keyboard 9 is displayed at a predetermined position on the screen of a CRT 10.

The CRT 10 is driven by a display apparatus controller (shown by CRTC in the diagram) 6. The display apparatus controller 6 executes a positioning control onto a picture plane of a character train to be displayed at the position of the cursor and a display control for displaying a character, symbol, or the like by converting the input character code to a dot pattern with reference to an internal character generator.

A document, an edition file formed on the screen of the CRT 10, an arithmetic operation processing result, and the like are stored in an external storage 11. The external storage 11 comprises a hard disk apparatus, a floppy disk apparatus, or the like. The writing and reading operations to/from the external storage 11 are controlled by a memory controller (shown by MC in the diagram) 7.

The document formed, edition file, arithmetic operation processing result, etc. are transmitted through a printer controller (shown by PRTC in the diagram) 8. The printer controller 8 is connected to the printer control unit 1001 of the laser beam printer 1000 through a bidirectional interface 21 and executes a communication control process with the laser beam printer 1000.

For example, the CPU 1 executes a developing (rasterizing) process of an outline font to a display information RAM set on the RAM 2, thereby enabling WYSIWYG to be performed on the CRT 10. The CPU 1 opens various kinds of windows registered on the basis of commands instructed by a mouse cursor or the like on the CRT 10 and executes various data processes.

On the other hand, the printer control unit 1001 of the laser beam printer 1000 has: an input section 18 connected to the printer controller 8 through the bidirectional interface 21; and a CPU 12 for integratedly controlling each device connected to a system bus 15 on the basis of a control program stored in a program ROM of an ROM 13, a control program stored in an external storage 14, or the like and supplying an image signal as output information to a printer engine 17 through a printer interface (I/F) 16. The CPU 12 executes a communicating process with the host computer 3000 through the input section 18.

Control procedures (flowcharts shown in FIGS. 4, 6, and 8) or the like which are executed by the CPU 12 are stored in the program ROM of the ROM 13 together with the foregoing control programs. Font data or the like which is used when the output information is used is stored in the font ROM. In addition to various data which is used on the host computer 3000, a data group (shown in FIG. 3) to manage a menu structure for setting a printer environment has been stored in a data ROM.

When the control program or control procedure stored in the ROM 13 is executed by the CPU 12, an RAM 19 is used as a work memory to temporarily store various data in an arithmetic operation or logic judgment of the CPU 12 and is also used as a bit map memory, an environment data storage memory, an NVRAM, or the like. The RAM 19 can extend a memory capacity in cooperation with an optional RAM which is connected to an extension port.

An instruction from the operation section 1012 is inputted to the CPU 12 through the system bus 15.

The arithmetic operation result or the like by the CPU 12 is stored in the external storage 14. Together with the above control program or the like, font data, emulation program, form data, etc. have been stored in the external storage 14. The external storage 14 comprises a hard disk apparatus, a floppy disk apparatus, or the like. The writing and reading operations to/from the external memory 14 are controlled by a memory controller (shown by MC in the diagram) 20.

Figure 3:
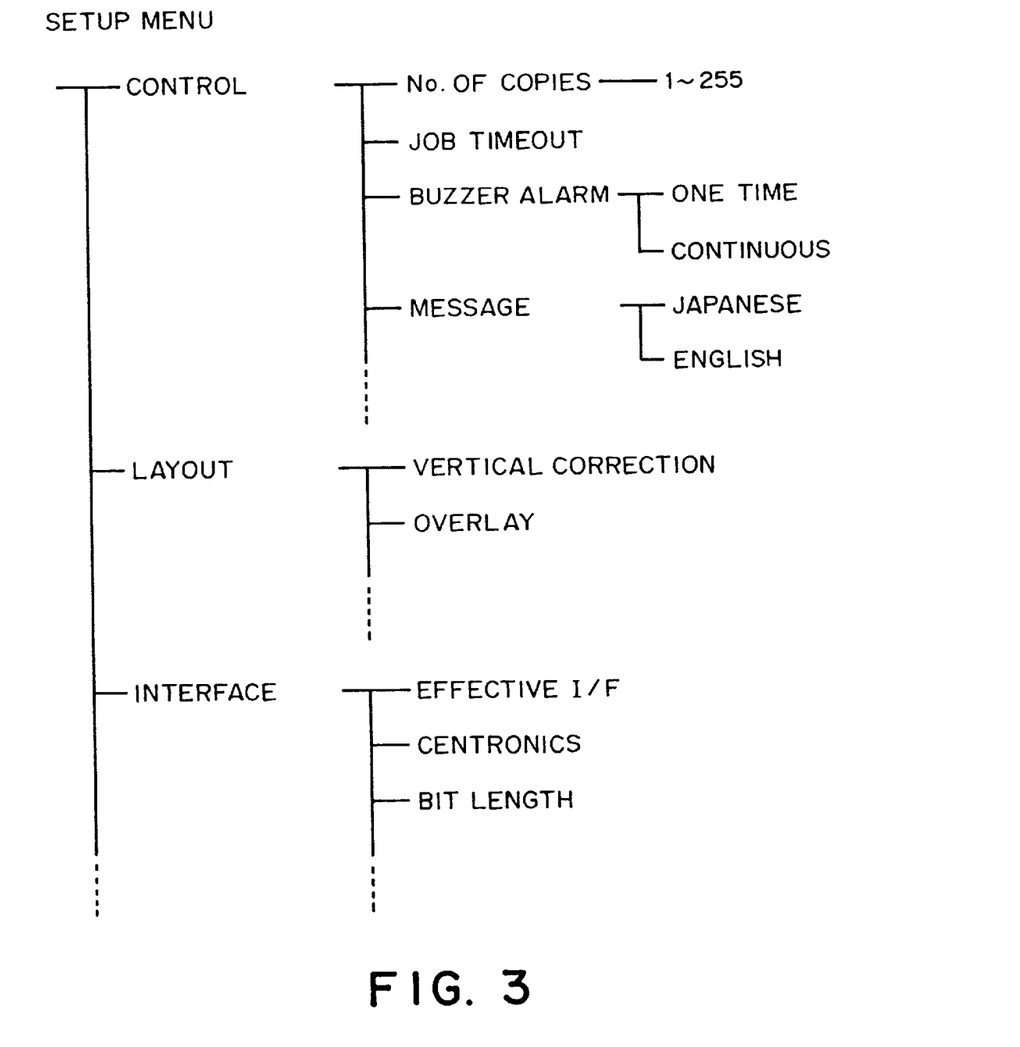
FIG. 3 is a diagram showing a structure of a data group to manage a menu structure for setting a printer environment which the laser beam printer of FIG. 1 has.

A structure of the data group to manage the menu structure for setting a printer environment will now be described with reference to FIG. 3. FIG. 3 is a diagram showing a structure of the data group to manage the menu structure for setting the printer environment which the laser beam printer of FIG. 1 has.

As shown in FIG. 3, the menu structure for setting a printer environment has a hierarchy data structure and by hierarchically tracing the data structure, the printer environment is set or changed.

For example, when setting the number of sheets to be printed by the user, an arrow key provided for the operation section 1012 is first pressed and a control is selected from the menu. By further pressing the arrow key, the number of copies is selected from the control menu. Subsequently, the number of sheets to be printed is inputted and set. The set contents are stored in the RAM 19. By those operations, the contents of the data group to manage the menu structure for setting the printer environment are set. The printer environment is set or changed in accordance with the set contents. The other data is also set by operations similar to those mentioned above.

Figure 4:
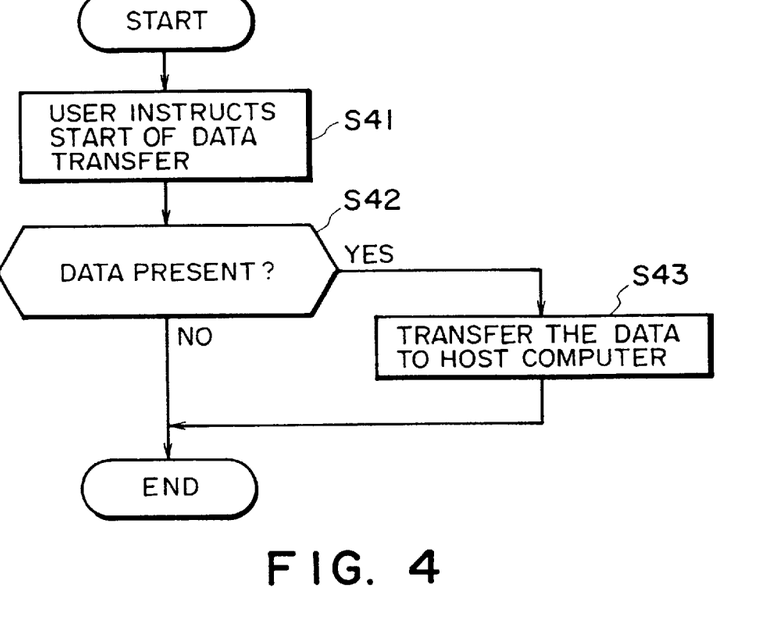
FIG. 4 is a flowchart showing a transfer procedure of a data group to manage a menu structure for setting a printer environment by a printer control unit of the laser beam printer of FIG. 1.

A transferring procedure of the data group to manage the menu structure for setting the printer environment by the printer control unit 1001 will now be described with reference to the drawings. FIG. 4 is a flowchart showing a transferring procedure of the data group to manage the menu structure for setting the printer environment by the printer control unit of the laser beam printer of FIG. 1.

With reference to FIG. 4, first, the start of the transfer of the data group to manage the menu structure for setting the printer environment to the host computer 3000 is instructed by the user by a key operation of the operation section 1012 (step S41).

After the start of the transfer was instructed, a check is made to see if the data group to manage the menu structure for setting the printer environment exists or not (step S42). If NO, the processing routine is finished.

When the data group to manage the menu structure for setting the printer environment exists, the data group is transmitted to the host computer 3000 through the interface 21 (step S43). After completion of the data transmission, the processing routine is finished.

Figure 5:
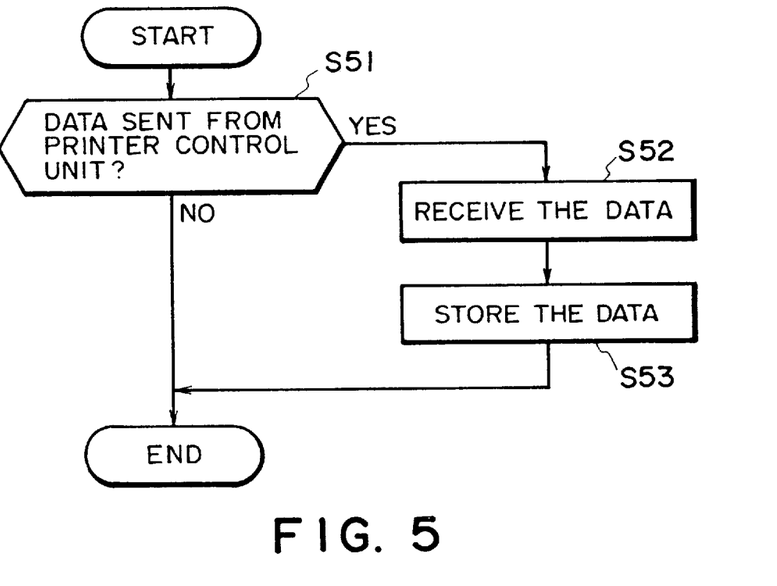
FIG. 5 is a flowchart showing a reception processing procedure of a data group to manage a menu structure for setting a printer environment from the laser beam printer by a host computer.

A reception processing procedure of the data group to manage the menu structure for setting the printer environment from the laser beam printer 1000 by the host computer 3000 will now be described with reference to the drawings. FIG. 5 is a flowchart showing a reception processing procedure of the data group to manage the menu structure for setting the printer environment from the laser beam printer by the host computer.

Referring now to FIG. 5, a check is made to see if the data group to manage the menu structure for setting the printer environment has been transmitted from the printer control unit 1001 or not (step S51). If NO, the processing routine is finished.

When the data group is transmitted from the printer control unit 1001, the transmitted data group is received (step S52) and stored (step S53). After the data group was stored, the processing routine is finished.

After completion of the receiving process, a printer environment for the laser beam printer 1000 is set on the basis of the stored data group.

By the above processes, the host computer 3000 sets the printer environment on the basis of the data group used to set the printer environment from the laser beam printer 1000. Therefore, the data group which is used to set the printer environment of the host computer 3000 and the data group which is used to set the printer environment of the laser beam printer 1000 are identical. There is no need to perform a troublesome operation for making the data group which is used to set the printer environment of the host computer 3000 coincide with the data group which is used to set the printer environment of the laser beam printer 1000.

When optional translator information is installed, there is no need to install the translator information to the host computer 3000.

In the embodiment, the start of the transfer to the host computer 3000 of the data group to manage the menu structure for setting the printer environment is instructed by the user by the key operation of the operation section 1012. However, in place of such a method, it is also possible to set so as to start the transfer to the host computer 3000 of the data group to manage the menu structure for setting the printer environment when the turn-on of a power source is detected.

The system in which one laser beam printer 1000 and one host computer 3000 are connected by the interface 21 has been described above as an example. The principle of the invention can be also applied to a system in which the laser beam printer 1000 is connected to a plurality of host computers 3000 by a network such as an LAN or the like. The plurality of computers 3000 can be allowed to easily possess the data group which is used to set the printer environment of the laser beam printer 1000. A troublesomeness which is required for the operation can be remarkably reduced.

Second Embodiment

The second embodiment of the invention will now be described with reference to the drawings.

A laser beam printer of the embodiment has almost the same construction as that of the first embodiment. In the embodiment, the data group used to set the printer environment at the previous time is temporarily held in the RAM 19. The previous data group used for setting the printer environment is compared with the current data group used for setting the printer environment, thereby judging whether the set contents of the data group have been updated or not. When the data group is updated, the updated data group is notified to the host computer 3000.

Figure 6:
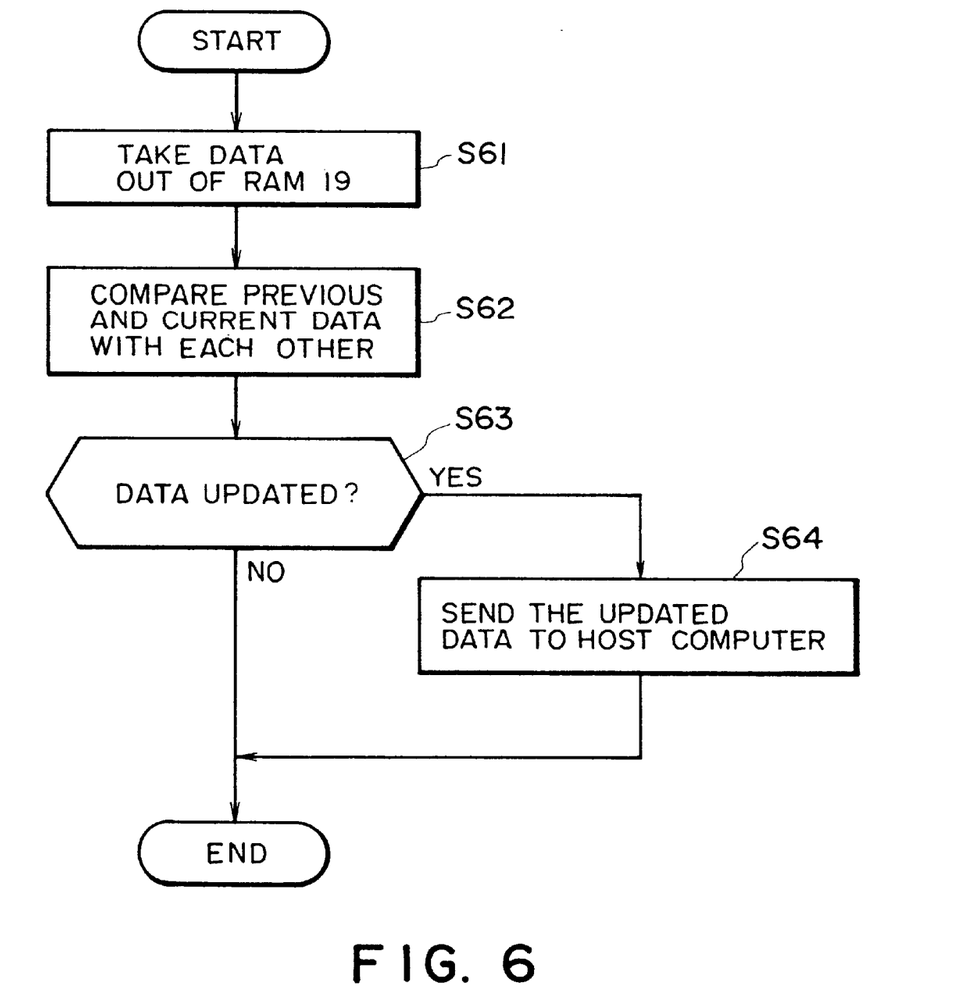
FIG. 6 is a flowchart showing a transferring procedure of a data group to manage a menu structure for setting a printer environment by a printer control unit of a laser beam printer according to the second embodiment of an output apparatus of the invention.

A transferring procedure of the data group to manage the menu structure for setting the printer environment by the printer control unit 1001 of the laser beam printer will now be described with reference to FIG. 6. FIG. 6 is a flowchart showing a transferring procedure of the data group to manage the menu structure for setting the printer environment by a printer control unit of the laser beam printer according to the second embodiment of an output apparatus of the invention.

Referring now to FIG. 6, first, the data group used to set the printer environment at the previous time is taken out from the RAM 19 (step S61). The previous data group used to set the printer environment is compared with the current data group used to set the printer environment (step S62).

On the basis of the comparison result in step S62, a check is made to see if the data group has been updated or not (step S63). If NO, the processing routine is finished.

When the data group is updated, the updated data group is transmitted to the host computer 3000 through the interface 21 (step S64). After the data group was transmitted, the processing routine is finished.

The reception processing procedure of the updated data group from the laser beam printer 1000 by the host computer 3000 will now be described.

The reception processing procedure of the updated data group from the laser beam printer 1000 by the host computer 3000 in the embodiment is substantially the same as the reception processing procedure by the host computer 3000 in the first embodiment. When the data group is transmitted from the printer control unit 1001, the transmitted data group is received and stored. After completion of the receiving process, the printer environment for the laser beam printer 1000 is set on the basis of the stored data group.

By the above processes, when the data group used to set the printer environment of the laser beam printer 1000 is updated, the updated data group is transmitted to the host computer 3000. Therefore, the data group which is used to set the printer environment of the host computer 3000 and the data group which is used to set the printer environment of the laser beam printer 1000 can be always made coincide.

Third Embodiment

The third embodiment of the invention will now be described with reference to the drawings.

The laser beam printer of the embodiment has almost the same construction as that of the first embodiment. In the embodiment, the data group is transferred on the basis of a data group transfer request which is generated from the host computer 3000 when the power source is turned on.

Figure 7:
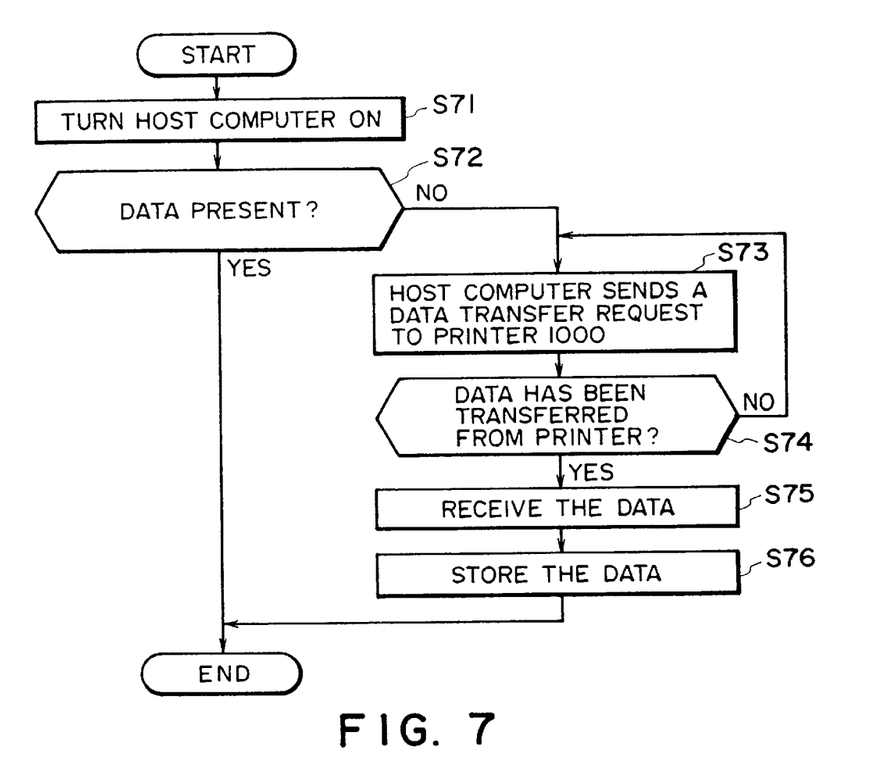
FIG. 7 is a flowchart showing a reception processing procedure of a data structure to manage a menu structure for setting a printer environment from a laser beam printer by a host computer connected to the laser beam printer according to the third embodiment of an output apparatus of the invention.
Figure 8:
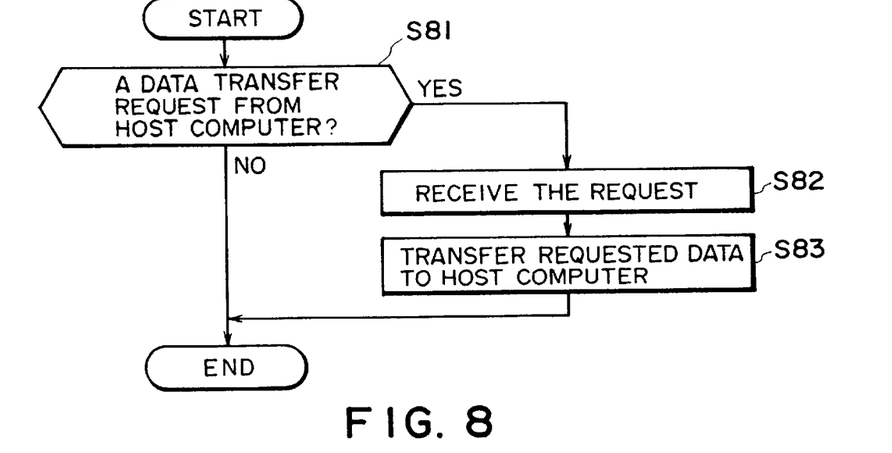
FIG. 8 is a flowchart showing a transferring procedure of a data group to manage a menu structure for setting a printer environment by a printer control unit of the laser beam printer according to the third embodiment of an output apparatus of the invention.

A data communicating process which is executed between the printer control unit 1001 and the host computer 3000 will now be described with reference to the drawings. FIG. 7 is a flowchart showing a reception processing procedure of a data group to manage a menu structure for setting a printer environment from a laser beam printer by a host computer connected to the laser beam printer according to the third embodiment of an output apparatus of the invention. FIG. 8 is a flowchart showing a transferring procedure of a data group to manage a menu structure for setting a printer environment by the printer control unit of the laser beam printer according to the third embodiment of the output apparatus of the invention.

When the power source of the host computer 3000 is turned on (step S71), as shown in FIG. 7, first, a check is made to see if the data group to manage the menu structure for setting the printer environment exists or not (step S72).

When the data group to manage the menu structure for setting the printer environment exists, the processing routine is finished.

When the data group to manage the menu structure for setting the printer environment doesn't exist, a data group transfer request is transmitted to the laser beam printer 1000 through the interface 21 (step S73).

After the data group transfer request was transmitted, a check is made to see if the data group has been transferred from the laser beam printer 1000 or not (step S74). The transfer request is outputted until the data group is transferred from the laser beam printer 1000.

On the other hand, on the printer control unit 1001 side of the laser beam printer 1000, as shown in FIG. 8, a check is made to see if the data group transfer request has been outputted from the host computer 3000 or not (step S81). If YES, the data group transfer request is received (step S82).

Subsequently, the data group to manage the menu structure for setting the printer environment is transferred to the host computer 3000 through the interface 21 on the basis of the received data group transfer request (step S83).

On the host computer 3000 side, as shown in FIG. 7, when the data group is transmitted from the printer control unit 1001, the transmitted data group is received (step S75). The received data group is stored (step S76). After the data group was stored, the processing routine is finished.

After completion of the receiving process, the printer environment for the laser beam printer 1000 is set on the host computer 3000 on the basis of the stored data group.

By the above processes, the data group is transferred from the laser beam printer 1000 on the basis of the data group transfer request which is generated in accordance with the presence or absence when the power source of the host computer 3000 is turned on. Therefore, the data group which is used to set the printer environment of the host computer 3000 and the data group which is used to set the printer environment of the laser beam printer 1000 are identical. There is no need to execute a troublesome operation for making the data group which is used to set the printer environment of the host computer 3000 coincide with the data group which is used to set the printer environment of the laser beam printer 1000.

In the embodiment, the host computer 3000 generates the data group transfer request in accordance with the presence or absence of the data group when the power source is turned on. However, in place of such a method, it is also to possible to set so as to generate the data group transfer request when the data group stored in the host computer 3000 is extinguished. As a cause of extinction of the data group held in the host computer 3000, there is considered a case where a command to delete the data group held in the host computer is erroneously generated by the user, a case where a backup power source of the RAM 2 to store the data group is shut off, or the like.

Each of the above embodiments has been described with respect to the example in which the data group to manage the menu structure for setting the printer environment is transferred to the host computer 3000 from the laser beam printer 1000. However, it is also possible to construct in a manner such that the set contents of the data group to manage the menu structure for setting the printer environment are updated by the operation on the host computer 3000, the printer environment is again set to the host computer 3000 on the basis of the updated data group, the updated data group is transmitted to the laser beam printer 1000 through the interface 21, and the printer environment is again set onto the laser beam printer 1000 on the basis of the transmitted data group. With such a construction, the setting of the printer environment of the laser beam printer 1000 can be executed on the host computer 3000 and a convenience regarding the setting operation of the printer environment can be improved.

In the above construction, by setting so as to make the operation for the printer environment setting on the host computer 3000 coincide with the operation for the printer environment setting on the laser beam printer 1000, it is possible to prevent that the user feels a physical disorder on the operation.

Each of the above embodiments has been described with respect to the laser beam printer as an example. However, the principle of the invention can be also applied to an output apparatus of a printer of the other type such as ink jet printer, dot matrix printer, LED printer, etc., a copying machine, or the like.

What is claimed is:

1. An output environment setting method in an output apparatus for forming information on the basis of information received from an external apparatus and outputting the formed information, comprising:
    a storing step of storing a data group to manage a menu structure for setting an output environment of the output apparatus into a memory for the output apparatus, the menu structure having a hierarchical structure;
    a comparing step of comparing a previous output environment and the output environment of the stored data group and discriminating, based on a comparison result, whether the output environment of the stored data group has been updated; and
    a transferring step of transferring the stored data group from the output apparatus to the external apparatus, without receiving a request for the output environment from the external apparatus, through an interface for connecting the output apparatus and the external apparatus in mutual communication, if it is discriminated in said comparing step that the output environment of the stored data group has been updated.

2. A method according to claim 1, wherein the menu structure sets a layout in the output apparatus.

3. An output environment setting method according to claim 1, wherein the stored data group is transferred by the output apparatus to the external apparatus automatically in response to discriminating in said comparing step that the output environment of the stored data group has been updated.

4. An output apparatus for forming information on the basis of information received from an external apparatus and outputting the formed information, comprising:
    storing means for storing a data group to manage a menu structure for setting an output environment of said output apparatus into a memory for said output apparatus, the menu structure having a hierarchical structure;
    comparison means for comparing a previous output environment and the output environment of the stored data group and discriminating, based on a comparison result, whether the output environment of the stored data group has been updated; and
    transfer means for transferring the stored data group from said output apparatus to the external apparatus, without receiving a request for the output environment from the external apparatus, through an interface for connecting said output apparatus and the external apparatus in mutual communication, if said comparing means discriminates that the output environment of the stored data group has been updated.

5. An apparatus according to claim 4, wherein the menu structure sets a layout in said output apparatus.

6. An output apparatus according to claim 4, wherein the stored data group is transferred by said output apparatus to the external apparatus automatically in response to said comparison means discriminating that the output environment of the stored data group has been updated.

7. A memory medium storing computer-executable process steps, the process steps for executing an output environment setting method in an output apparatus for forming information on the basis of information received from an external apparatus and outputting the formed information, the method comprising:
    a storing step of storing a data group to manage a menu structure for setting an output environment of the output apparatus into a memory for the output apparatus, the menu structure having a hierarchical structure;
    a comparing step of comparing a previous output environment and the output environment of the stored data group and discriminating, based on a comparison result, whether the output environment of the stored data group has been updated; and
    a transferring step of transferring the stored data group from the output apparatus to the external apparatus, without receiving a request for the output environment from the external apparatus, through an interface for connecting the output apparatus and the external apparatus in mutual communication, if it is discriminated in said comparing step that the output environment of the stored data group has been updated.

8. A method according to claim 7, wherein the menu structure sets a layout in the output apparatus.

9. A memory medium storing computer-executable process steps according to claim 7, wherein the stored data group is transferred by the output apparatus to the external apparatus automatically in response to discriminating in said comparing step that the output environment of the stored data group has been updated.

* * * * *